United States Patent [19]
Whittaker

[11] 3,774,817
[45] Nov. 27, 1973

[54] HOT MELT ADHESIVE APPLICATOR

[75] Inventor: Harold F. Whittaker, Haverhill, Mass.

[73] Assignee: Thermotech Inc., Haverhill, Mass.

[22] Filed: Mar. 10, 1971

[21] Appl. No.: 122,898

[52] U.S. Cl. .......... 222/334, 222/146 HE, 222/389, 222/391
[51] Int. Cl. .............................................. B67d 5/62
[58] Field of Search ............ 222/391, 389, 146 HE, 222/334, 146 R; 226/167; 401/1, 2

[56] References Cited
UNITED STATES PATENTS

| | | | |
|---|---|---|---|
| 2,995,159 | 8/1961 | Berggren .................. | 222/146 HE X |
| 3,377,012 | 4/1968 | Cushman ..................... | 222/146 HE |
| 1,951,545 | 3/1934 | Carson, Jr. .................... | 226/167 X |
| 2,692,706 | 10/1954 | Wiksten ......................... | 222/389 X |

*Primary Examiner*—Robert B. Reeves
*Assistant Examiner*—John P. Shannon
*Attorney*—Wolf, Greenfield & Sacks

[57] ABSTRACT

A hot melt adhesive applicator for receiving a continuous solid rod of adhesive hot melt material and dispensing said adhesive material in molten form. The applicator has a hot melt adhesive heated reservoir at one end of which is a ball spring nozzle assembly for discharging molten adhesive. A tubular canal means interconnects with the reservoir for passing a solid, continuous, elongated, hot melt adhesive rod forwardly to the reservoir and preheating the rod during passage. A split tube is aligned with the canal and reciprocal gripping means act within the split tube to grip a periphery of the solid rod and push it toward the reservoir. A reciprocal motion of the gripping means moves the gripping means away from the reservoir without substantially moving the rod but moving it only slightly rearwardly to relieve pressure in the reservoir. A stop means coacts with the gripping means to prevent substantial movement of the rod during return action of the gripping means. An insulating handle mounts the device for portable use. The gripping means is preferably actuated by pneumatic pressure through at least one double acting air cylinder.

5 Claims, 8 Drawing Figures

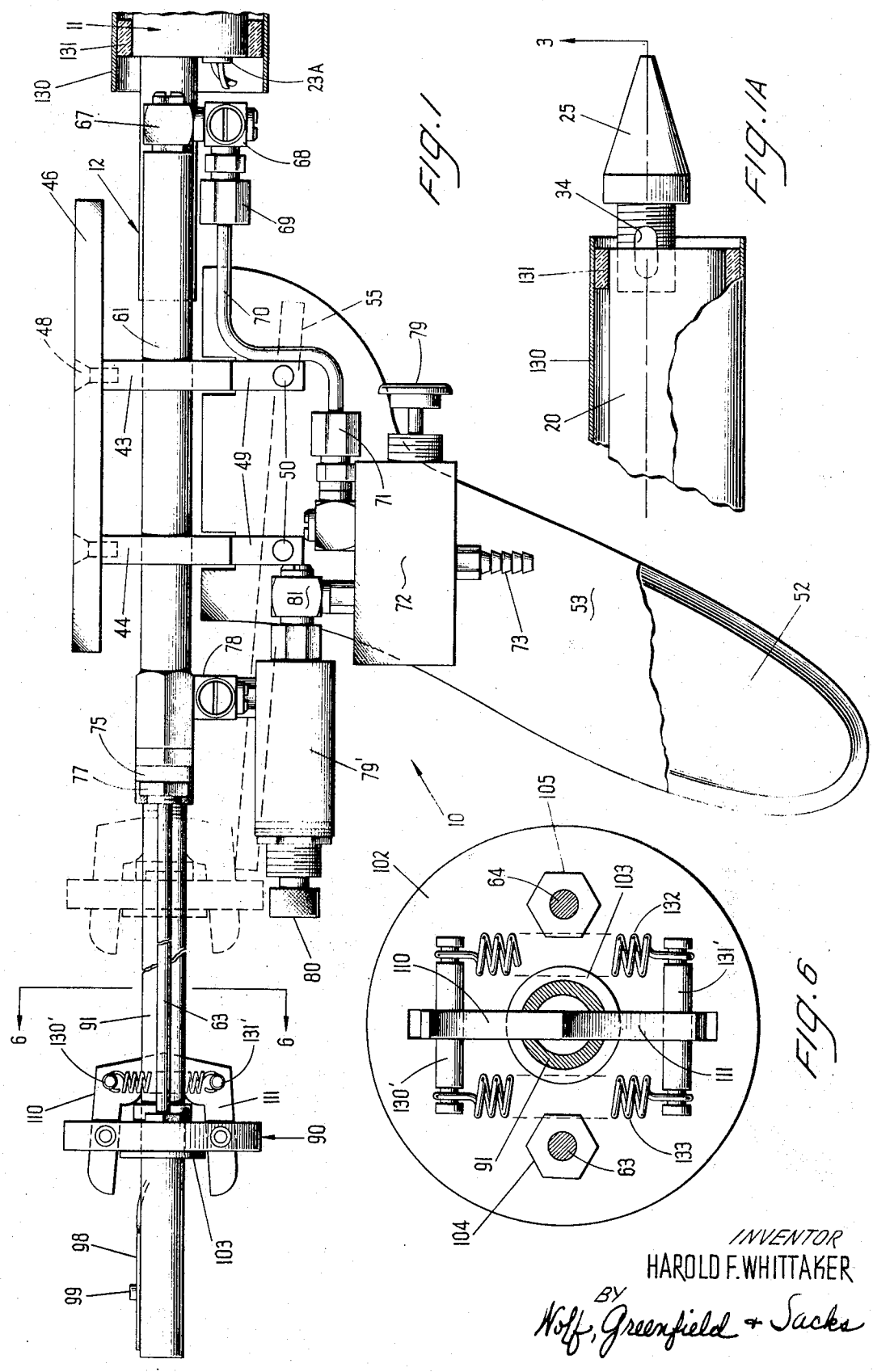

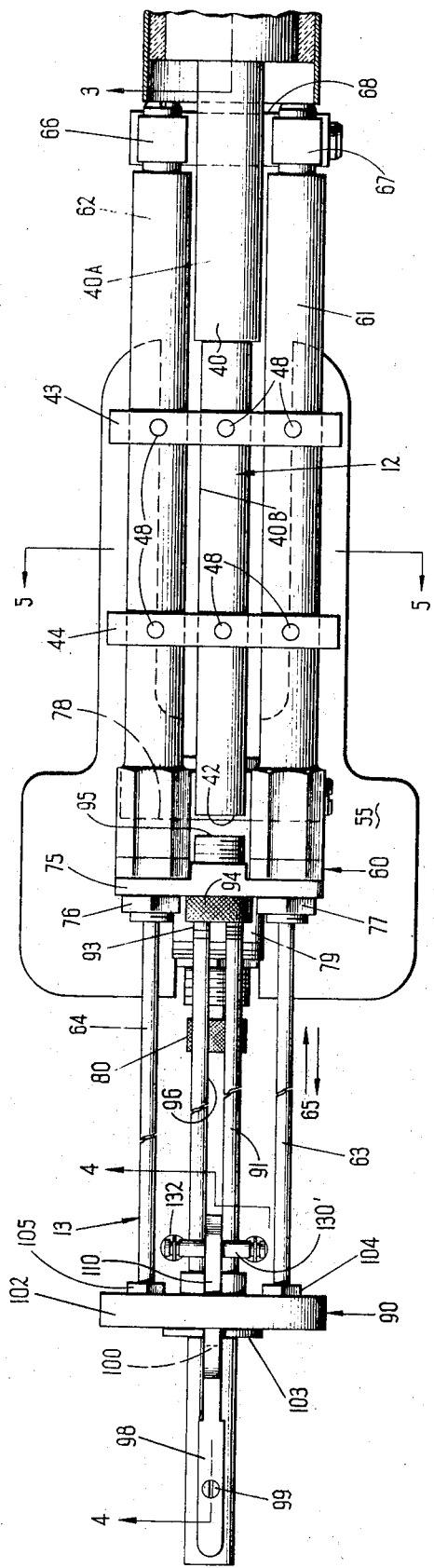

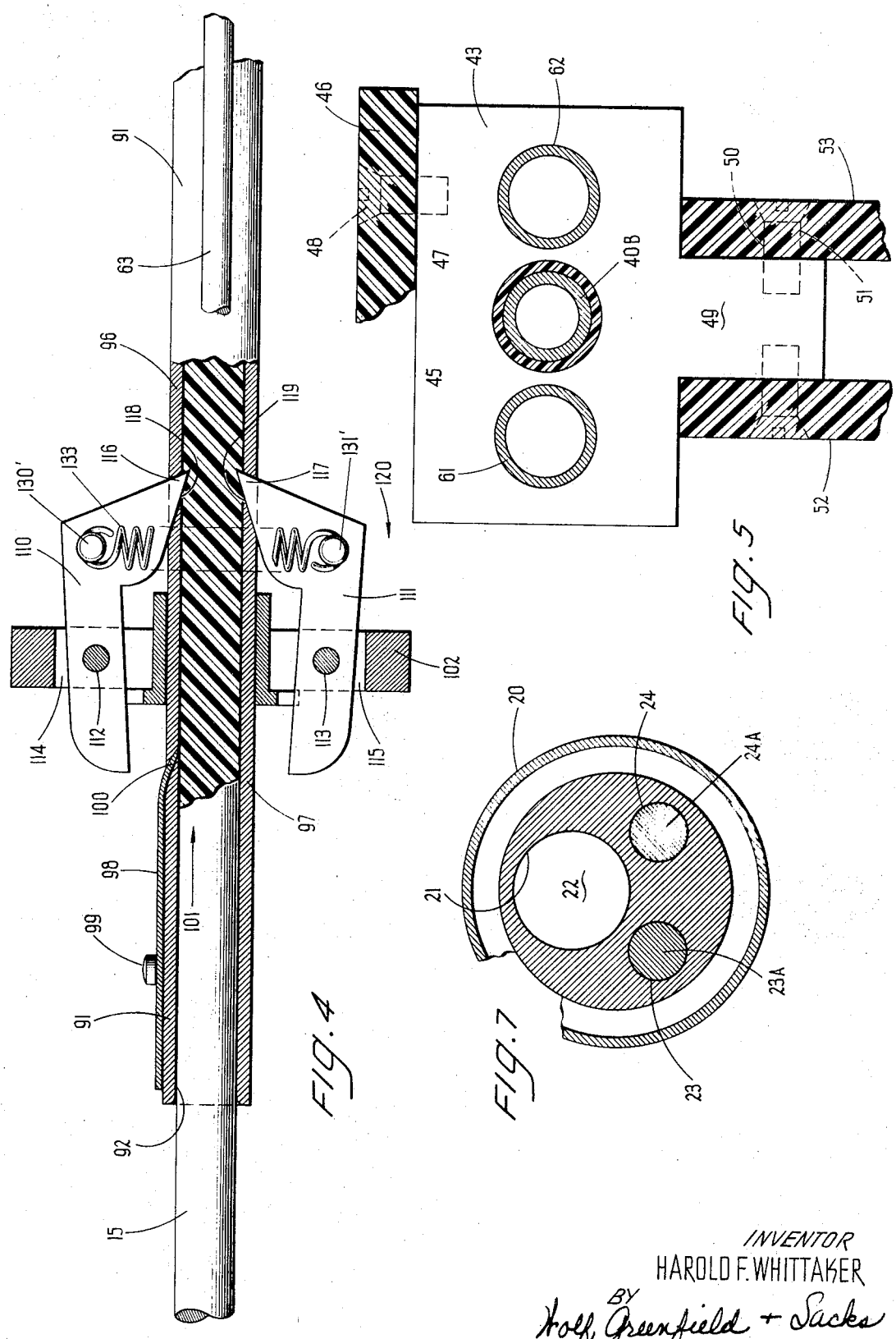

HOT MELT ADHESIVE APPLICATOR

BACKGROUND OF THE INVENTION

Hot melt adhesives of various types have long been known in the art for use in joining materials such as shoe parts and the like. Such adhesives include modified polyethylenes having melting points of from 75°C to 110°C and viscosities of from 2,500 to 25,000 centipoise (Brookfield LVT, spindle SC4-34, 3.0 rpm, 350°F), and polyamides such as dimer acid based polyamides having melting points of from 95°C to 160°C and viscosities of from 10 Poise to 60 Poise at 210°C using a Brookfield Model RVF spindle No. 3 at 20 rpm.

The adhesives are often used by melting them in glue pots whereupon various applicators including hand spatulas are used for application. Other applicators of a more recent type have included cartridge fed heating devices for heating slugs of hot melt adhesive and applying the slugs through a nozzle to surfaces to be joined. Another type of known hot melt applicator includes an extrusion-type orifice to which molten material is fed by ram or other means acting directly on the liquid hot melt after it is heated. In still another type, a continuous adhesive rod is fed to an applicator which has a heated reservoir.

Such known applicators often have one or more disadvantages including degradation of the adhesive due to oxygen exposure, difficulty of controlling the amount of adhesive applied by the applicator in a given period, heavy weight, lack of portability, lack of positive portion control, unwanted molten adhesive flow after turn-off, and required use of specialized cartridges for loading.

Still another disadvantage of many known hot melt adhesive applicators is their inability to receive the hot melt adhesive material directly in continuous solid rod form and discharge the molten rod in predetermined portions as a mass. In known rod feed applicators, it is difficult to relieve pressure in the molten mass formed therefrom often causing unwanted adhesive flow after turn-off and making spot application difficult. Yet, most known hot melt adhesives are commercially sold in rod form.

SUMMARY OF THE INVENTION

It is an object of this invention to provide an improved hot melt adhesive applicator for receiving a continuous solid rod of hot melt adhesive and for efficiently dispensing the adhesive in molten form.

Still another object of this invention is to provide an applicator in accordance with the preceding object which is easily adaptable to dispensing predetermined portions at predetermined rates with positive cut-off of adhesive flow when desired.

Still another object of this invention is to provide an applicator in accordance with the preceding objects which is lightweight and portable.

A still further object of this invention is to provide an efficient method of receiving a continuous, solid rod of hot melt adhesive and efficiently dispensing the adhesive in molten form.

According to the invention, a hot melt adhesive applicator for receiving a continuous, solid rod of hot melt adhesive material and dispensing the adhesive material in molten form has a discharge means. A hot melt adhesive heated reservoir means is interconnected with the discharge means. A canal means, for passing the elongated hot melt adhesive rod to the reservoir, is positioned directly before the reservoir and acts to preheat the rod. Feeding means for intermittently feeding the rod to the canal are provided whereby a portion of the rod passes to the reservoir means through the canal means. The feeding means comprises a means for gripping and advancing the rod in one direction toward the canal means while permitting movement of the gripping and advancing means in a second reciprocal direction opposed to the one direction without substantial corresponding movement of the rod. The feeding means further comprises a stop means which permits advancement of the rod in the one direction while preventing substantial movement of the rod in the second direction thus allowing only slight reciprocal movement of the rod to relieve pressure buildup in the reservoir.

Preferably the discharge means comprises an orifice having a valve assembly therein which permits discharge of molten adhesive only when pressure is applied thereto. Preferably the feeding means comprises a slotted guide tube aligned with the canal means and a pair of spring biased dogs constructed and arranged to act on a peripheral surface of the rod. Preferably the gripping and advancing means is mounted for reciprocal movement along the slotted guide tube by a pair of double acting air cylinders which can be actuated manually by a control valve to cause advancement of the rod which automatically causes discharge through the discharge means. Preferably the stop means is a spring finger which is positioned to cut into a surface of the rod and stop substantial movement thereof in one direction while allowing sliding of the rod therepast in another direction.

In the method of this invention, a continuous, solid rod of hot melt adhesive is advanced to a heated reservoir where the forward end is melted. The solid portion of the rod acts to force the molten mass formed out of the reservoir. A slight rearward movement of the rod is used to relieve pressure in the reservoir when adhesive flow is stopped.

It is a feature of this invention that the reservoir means prevents degradation of the adhesive by control of temperature and closure to the atmosphere. Continuous melting of the hot melt adhesive is obtained with the aid of a premelt tube or canal assembly in conjunction with the reservoir. The rod material can be intermittently fed with a positive feeding action by precision ground dog assemblies using twin air cylinders and the slotted guide tube means. Predetermined portions of the adhesive can be dispensed in given amounts during given time periods.

The applicator can be light in weight, portable and provide for continuous loading. The adhesive output is adjustable as desired and a choice of adhesive patterns can be obtained by use of interchangeable discharge nozzles if desired. The applicator can apply adhesive in any position desired in various uses.

BRIEF DESCRIPTION OF THE DRAWINGS

The above and other features, objects and advantages of the present invention will be better understood from the following description when read in conjunction with the accompanying drawings in which:

FIG. 1 is a side view of a preferred embodiment of the adhesive applicator of this invention with the front portion not shown;

FIG. 1A is a side view of the front portion thereof;

FIG. 2 is a top view thereof with a cover element removed;

FIG. 3 is a side partial cross sectional view through line 3—3 of FIGS. 1 and 1A;

FIG. 4 is a side cross sectional view through line 4—4 of FIG. 2;

FIG. 5 is a cross sectional view through line 5—5 of FIG. 2 showing a portion of the cover element;

FIG. 6 is a cross sectional view through line 6—6 of FIG. 1; and

FIG. 7 is a cross sectional view through line 7—7 of FIG. 3.

DESCRIPTION OF PREFERRED EMBODIMENTS

With reference now to the drawings, a preferred embodiment of the hot melt adhesive applicator of this invention is illustrated genreally at 10 in FIG. 1 in the form of a hand gun shape having a reservoir section 11, a premelt canal section 12, a feeding rear section 13 and a forward discharge section 14 for feeding an elongated solid, continuous rod 15 of hot melt adhesive through the applicator, melting the adhesive and discharging and applying the molten adhesive through the discharge section.

As best shown in FIGS. 1, 1A, 3 and 7, the reservoir section 11 has a cylindrical body 20 of good heat conducting material such as aluminum. The body 20 defines a bore 21 which in turn forms a cylindrical reservoir 22 within the body. Axially extending bores 23 and 24, FIG. 7, are provided in the body with an electrical heating rod 23A of a conventional type mounted in bore 23 and a conventional thermostat 24A mounted in bore 24. The heating rod 23 and thermostat 24A are interconnected to suitable electrical wiring, not shown, to provide desired heating to the entire body 20, which because of its good thermal conductivity, can be uniformly heated to desired temperatures for melting of the rod hot melt adhesive passed therethrough.

The discharge section 14 is formed of a nozzle 25 having a rearwardly extending cylindrical sleeve 26 which is preferably threaded on the outside at 27 and on the inside at 28. The sleeve 26 carries a spring 29 and ball valve 33. An externally threaded nipple 31 is mounted partially within the sleeve 26 and has an axially extending bore 32 ending at a seat 30 for the spring loaded ball valve 33. The sleeve 26 carries identical elongated axially extending slots 34 on either side thereof communicating with the bore of sleeve 26. As best shown in FIG. 3, when pressure is exerted along the line of arrow 37 as by molten adhesive, the ball 33 shifts in the direction of arrow 37 to allow the adhesive to pass through slots 34 and from there over the nozzle 25 to be applied where needed. When no pressure or insufficient pressure is exerted on the ball valve member 33, the device automatically closes and prevents further discharge of molten hot melt adhesive.

The premelt canal section is formed of an aluminum tube 40 defining an elongated, continuously uniform, cylindrical rod passageway 41 preferably axially aligned with bore 21 and screw threaded to the rear end of bore 21. The tube 40 preferably has a first thickened outer diameter at 40A and a second section 40B of smaller diameter than section 40A ending at rear end 42 open to the atmosphere. This tube 40 acts as a premelt area so that the rod of hot melt adhesive is heated by heat conducted from the body 20, particularly in the thickened section 40A, to ready the rod for melting when it enters the reservoir 22. Preferably the tube 40 is formed of a high conductivity metal and may be aluminum as is the body 20.

A support frame for the applicator 10 is made up of two T-shaped metallic mounting plates 43 and 44 which are identical to each other. As best shown in FIGS. 2 and 5, plate 44 has a mounting hole 45 lined with an insulating sleeve 47 which snugly receives portion 40B of the premelt tube and mounts it. The upper portion of the plates 43 and 44 are joined and rigidly held in place by a top or cover plate 46 which is removed in FIG. 2 for clarity, but shown clearly in FIGS. 1 and 5. Plate 46 is joined to plates 43 and 44 by conventional screws as indicated at 48. The tab portions 49 of each of plates 43 and 44 have side opening threaded bores 50 for receiving suitable screws as illustrated at 51 to mount identical handle gun grip panels 52 and 53 best shown in FIGS. 1 and 5. Handle panel 52 is partially broken away in FIG. 1 in order to clarify the drawings. The panels 52 and 53 provide a hand grip section as well as providing rigidity to the frame by joining with the bottom portions of plates 43 and 44.

A heat shield in the form of a plastic, planar, split T member 55 best shown in FIGS. 1 and 2 is slid into the position shown in FIG. 2 to provide heat isolation from the upper portion of the gun for the hand of the user. The member 55 is friction held in position engaging the handle panels 52 and 53.

The feeding section 13, for advancing the rod of hot melt adhesive material 15, is formed of a gripping assembly 90 and a pneumatic assembly 60. The pneumatic assembly has an elongated double acting air pressure cylinder 61 with a parallel, second, identical, elongated double acting air pressure cylinder 62 passing through and snugly held within preformed holes in the support plates 43 and 44 as best illustrated in FIGS. 2 and 5. Each of the air cylinders 61 and 62 has a double acting, reciprocal, push rod 63 and 64 for identical reciprocal movement in the direction of arrows 65. Forward ends of cylinders 61 and 62 each have suitable air fittings 66 and 67 interconnected through a distribution conduit block 68 which is in turn connected through gas tight fitting 69 to an air tube 70 passing through fitting 71 to a two-position spring loaded air valve 72 which is in turn interconnected with a nipple 73 to a source of constant air pressure (not shown). The rear ends of cylinders 61 and 62 are rigidly connected together by a cross plate 75 locked in position by threaded nuts 76 and 77. The rear ends of the cylinders 61 and 62 are pneumatically interconnected through conduit block 78, substantially identical to block 68, which is in turn connected by a common air passageway to a conventional air pressure regulator 79' having a screw 80 for adjusting air pressure passing to the rear ends of the cylinders as by providing leakage when desired to adjust the air pressure. The regulator is in turn pneumatically connected through a conventional fitting 81 to the valve 72.

Valve 72 can be any air pressure valve designed to move piston rods 63 and 64 reciprocally when desired. In the present embodiment, the valve is a two-way valve having a spindle actuated by spring loaded finger trigger 79. Thus, when the trigger is in its outermost position as shown in FIG. 1, air is directed through line 70 to simultaneously move the piston rods 63 and 64 to the full line position shown in FIGS. 1 and 2 and hold them in this position, while allowing exhaust to the atmosphere through connections to the rear ends of the cylinders. When the trigger 79 is depressed as by finger pressure, air is applied through cross block 78 allowing exhaust through the valve from line 70 and simultaneously moving the piston rods to the front of the device to advance the hot melt adhesive rod 15 as will be described. The regulator 79' can be adjusted to allow bleeding of air and hence adjustment in the speed of travel of the piston rods toward the forward end and consequently adjustment in the speed of travel of the rod 15 when the trigger is actuated.

The gripping assembly 90 is slidably mounted on a slotted guide tube 91 having an inner bore 92 axially aligned with bore 41 and dimensioned to snugly and slidably receive the rod 15. The forward end of the slotted guide tube 91 is mounted through screw threads 93 on the cross bar 75 by an internally threaded ferrule 94 in turn threaded to the cross bar. The forward end 95 of the slotted guide tube is preferably spaced from the rear end 42 to provide an air gap thereby dissipating heat from tube 40. The air gap acts as an insulation means to prevent unwanted heating of the rod prior to entrance into tube 40. The guide tube 91 defines elongated slots 96 and 97 at the top and bottom. A spring finger stop 98 is mounted by a screw 99 in a fixed position on tube 91 and has a downwardly pointed spring end 100 positioned in slot 96 and biased into the bore of the tube 91. Thus, when the rod 15 moves in the direction of arrow 101 the rod is free to slide past the end 100. However, any tendency of the rod to move substantially in a direction opposite to arrow 101 is prevented by the sharp end 100 digging into the rod and preventing rearward movement. It is important that a slight rearward movement of the rod be allowed in order to relieve pressure in the reservoir when the gripping assembly 90 returns to the position shown in FIG. 1. The pressure relief prevents the molten adhesive in the reservoir from being forced between the rod and inside wall of tube 40 which might result in unwanted flow of molten adhesive at the end 42 during rearward movement and positioning of the gripping assembly 90, or might prevent sharp cut off of molten flow of adhesive by the ball valve 33 when the gripping assembly moves rearwardly. Preferably the rod only moves about one-fourth inch toward stop end 100 before it is engaged by the cutting edge thereof and prevented from further rearward movement. The rearward length of travel is kept small in order to keep the rod in immediate position for melting on movement of the gripping assembly to the forward position by actuation of trigger 79. The term "substantial" as applied to rearward movement of the rod is used to mean a movement over a distance less than the distance of forward movement of the rod when the trigger is actuated and in the preferred embodiments, a distance of less than 1 inch and preferably about one-fourth inch.

A circular base plate or disc 102 acts as a mounting suppport for the gripping assembly. The disc 102 is slidably mounted on the guide tube 91 by means of a sliding ferrule 103 sliding on the tube and fixed to the disc 102. Piston rods 63 and 64 are screw threaded into threaded bores provided in the plate 102 and locked in position by lock nuts 104 and 105 respectively. Opposed spring loaded dogs 110 and 111 are each pivotally mounted by pins 112 and 113 in cutout portions 114 and 115 of the disc 102. As best shown in FIGS. 1, 2, 4 and 6, each of the dogs has a generally L shape with a pointed cutting end 116, 117 dimensioned to pass into the slots 96 and 97 respectively in use. The cutting ends 116 and 117 dig into the rod and when the disc 102 is moved in the direction of arrow 101 to pull the rod 15 along with the plate as when the trigger 79 is depressed. On the other hand, surfaces 118 and 119 permit the dogs to pivot about pivot pins 112 and 113 when the rod 15 is held stationary by the stop means spring 98 and the support plate 102 is moved in the direction of arrow 120 as when the trigger is in the position shown in FIG. 1.

Each of the dogs can be spring loaded to be biased toward the center of tube 91 by various means although the particular mechanism shown in FIGS. 2, 4 and 6 is preferred. In this mechanism, cross pins 130' and 131' are fixed to the dogs 110 and 111 respectively and have ends mounting springs 132 and 133. The springs pull the dogs toward each other with sufficient force to cause biting of the cutting edges 116 and 117 into the hot melt rod except when the cam surfaces 118 and 119 are slid in the direction of arrow 120.

In the preferred embodiment, an insulating cylindrical shield 130 surrounds the body 20 and is spaced therefrom by insulating ring spacers 131 at either end of the body. Shield 130 acts as a protective shield to prevent the hand of the user from contacting the hottest part of the applicator.

In the preferred embodiment, the weight and size of the applicator is extremely small. For example, the body 12 has an outer diameter of approximately 1 inch and a length of approximately 4 inches. Passageway 21 has a diameter of one-half inch. Tube 40 has a length of 5 ½ inches and an inner diameter of one-fourth inch corresponding to the approximate outer diameter of rod 15. Split tube 91 has a length of 6 ½ inches and an inner diameter of one-fourth inch. The over-all weight of the gun is approximately 2 pounds. The valve ball 33 opens at a pressure of about 30 lbs/sq.in. The heating chamber body 20 is heated to a temperature of 380°F as when using Thermotech No. 701 hot melt adhesive rod which is a modified polyethylene, wax, hydrocarbon resin having a softening point of 80°C and a viscosity of 5,350 cps at 350°F with Brookfield model LVT, spindle SC-4-31 3 rpm. The air pressure line attached to nipple 73 has a pressure of 80 lbs/sq.in. The air pressure cylinders are each Clippard No. 3SD-3 (three-eighths inch bore – 3 inches stroke) and the valve 72 is a Clippard MAV-4 (four-way valve). The gun can be operated repeatedly to deliver molten hot melt adhesive through the nozzle with sharp cut off of molten adhesive flow when the trigger is released.

In operation of the adhesive applicator 10, a solid rod of hot melt adhesive 15 such as the lead end of a long coil of rod 15 is loaded into the gun by passing the rod through tube 91 past the air gap through the premelt tube 40 and into the reservoir 22. The heater 23A and thermostat 24A are electrically actuated through suitable wiring as known in the art to melt the rod within the chamber 22 with additional rod being pushed through the rear of the gun until the chamber 22 is filled with molten adhesive. This initial loading need not be repeated at later stages since the gun will remain fully loaded and ready for use at all times after the initial loading whenever the heater means has heated the reservoir 22.

In the starting position as shown in FIG. 1, the spring loaded valve 72 allows exhaust of gas from the rear end of the air cylinders and provides air pressure through line 70 to the forward end of the cylinders holding the gripping means 90 in the position shown. The operator then using finger pressure to depress the trigger 79 which allows exhaust of air pressure from the forward end of the cylinders through conduit 70 and applies air pressure to the rear end of the cylinders through the regulator 79' which is preadjusted to give the desired air pressure and thus control the rod feeding speed. Depression of the trigger 79 causes the gripping means to move forward to the forward position shown in dotted outline in FIG. 1 carrying the rod with it and thus feeding the rod through the premelt tube 40 where it is softened to the reservoir 22 where it is melted. The advancing pressure of the rear end of the solid rod causes a buildup of pressure in the reservoir which opens the ball valve 33 allowing extrusion of molten adhesive out of slots 34 and around the nozzle 25 to the tip or fowardmost end of the gun. When the gripping means 90 reaches its forward position, the spring loaded trigger 79 can be released by the finger causing reversal of air pressure in the double acting cylinders and return of the gripping means to the full line position shown in FIG. 1. When the gripping means starts to move rearwardly after the trigger 79 is released, the rod 15 due to the spring clamping of springs 132 and 133 will move rearwardly only very slightly as for example one-eighth inch to one-fourth inch when the stop end 100 cuts into the rod and stops further rearward movement so that the gripping means 90 slides back to the position shown in FIG. 1 without further moving the rod rearwardly. This feature is important since it relieves pressure in the reservoir 22 and on the ball valve 30 so that positive cutoff of adhesive flow is obtained substantially immediately upon release of the trigger 79. Thus, predetermined amounts of adhesive can be extruded through the ball valve and the speed of extrusion can be adjusted by the air pressure through the regulator 79'. As thus described, the rod can be intermittently advanced, moved slightly rearwardly and then advanced again with the cycle continuing at varying speeds depending upon the operator's choice and speed of depression of trigger 79. By rapidly actuating the trigger 79, substantially continuous flow can be achieved with slight interruption during rearward movement of the rod or alternately, long spaced depressions of the trigger 79 can be used to obtain distinct predetermined portions of adhesives at the nozzle 25.

In the method of this invention as carried out by the gun 10, a continuous elongated rod of hot melt adhesive is intermittently advanced to have a forward portion of the rod at a melting zone in the reservoir 22, a sequential portion of the rod at a preheating zone in tube 40 with a sequential solid portion of the rod providing pressure to extrude the molten portion of the rod. Between each intermittent advancement step, there is a slight rearward rod movement step to relieve the pressure.

While a specific embodiment of this invention has been shown and described, it should be understood that many variations thereof are possible. For example, the particular nozzle valve assembly can vary greatly as known in the art. The length and dimensions of parts can vary depending upon the particular material fed into the applicator and the output desired. Similarly, air pressure values and cycle times can be adjusted to that desired. The term "solid" as used in connection with the hot melt adhesive rod is used to denote a non-molten rod. The rod 15 may have a solid or continuous cross section or can be partially hollowed out in some embodiments. The cross sectional configuration of the rod need not be circular but can be elliptical, square or of other shapes as desired preferably with corresponding changes in the shapes of the tubes and passageway through which the rod passes to provide snug sliding fit of the rod and prevent backflow of molten adhesive. While it is preferred to have a slight rearward movement of the rod when the gripping and feeding means retract to the rearmost position, in some cases a positive stop can be used to prevent any rearward movement of the rod. For example, spring end 100 can be designed to apply sufficient pressure to the rod to prevent rearward movement of the rod when the spring loaded dogs are returning to their rearmost position.

What is claimed is:

1. A hot melt adhesive applicator for receiving a continuous solid rod of hot melt adhesive material and dispensing said adhesive material in molten form,
    said applicator comprising,
    a discharge means comprising a pressure actuated valve,
    a hot melt adhesive reservoir means interconnected with said discharge means,
    canal means for passing a continuous elongated hot melt adhesive rod to said reservoir means,
    feeding means for intermittently feeding said continuous hot melt adhesive rod to said canal means whereby a portion of said rod simultaneously passes to said reservoir means,
    said feeding means comprising means for gripping and advancing said rod in one direction toward said canal means while permitting movement of said gripping and advancing means in a second direction opposed to said one direction,
    said feeding means further comprising stop means which permits advancement of said rod in said one direction and prevent substantial movement of said rod in said second direction,
    said means for gripping and advancing said rod in one direction acting in conjunction with said stop means for moving said rod in said second direction a distance less than movement of said rod in said one direction,
    said gripping and advancing means comprising a first spring biased dog constructed and arranged to act on a peripheral surface of said rod and a reciprocally moving mounting plate for said dog,
    a second spring biased dog constructed and arranged to act on a peripheral surface of said rod and biased toward said first spring biased dog with said first and second spring biased dogs being pivotally mounted on said mounting plate,
    and double acting air cylinder means for moving said mounting plate and dogs in said one direction and in said second direction,
    said double acting air cylinder means comprising first and second double acting air cylinders each having a piston, said pistons being interconnected with said mounting plate,
    air conduit means for moving said pistons in said one direction and second air conduit means for moving said pistons in said second direction, and valve means for alternately applying pressure to said first air conduit means and said second air conduit means.

2. A hot melt adhesive applicator in accordance with claim 1 wherein said valve means is manually operable.

3. A hot melt adhesive applicator in accordance with claim 2 wherein an air pressure regulator is interconnected with said first air conduit means for regulating air pressure in said first air conduit means.

4. A hot melt adhesive applicator for receiving a continuous solid rod of hot melt adhesive material and dispensing said adhesive material in molten form, said applicator comprising, a discharge means comprising a pressure actuated valve, a hot melt adhesive reservoir means interconnected with said discharge means, canal means for passing a continuous elongated hot melt adhesive rod to said reservoir means, feeding means for intermittently feeding said continuous hot melt adhesive rod to said canal means whereby a portion of said rod simultaneously passes to said reservoir means, said feeding means comprising means for gripping and advancing said rod in one direction toward said canal means while permitting movement of said gripping and advancing means in a second direction opposed to said one direction, said feeding means further comprising stop means which permits advancement of said rod in said one direction and prevents substantial movement of said rod in said second direction, said means for gripping and advancing said rod in one direction acting in conjunction with said stop means for moving said rod in said second direction a distance less than movement of said rod in said one direction, said gripping and advancing means comprising a first spring biased dog constructed and arranged to act on a peripheral surface of said rod and a reciprocally moving mounting plate for said dog, a second spring biased dog constructed and arranged to act on a peripheral surface of said rod and biased toward said first spring biased dog with said first and second spring biased dogs being pivotally mounted on said mounting plate, and double acting air cylinder means for moving said mounting plate and dogs in said one direction and in said second direction, said feeding means further comprising a tube defining first and second slots, said first and second spring biased dogs being positioned in said first and second slots respectively for movement therein, said mounting plate being mounted on said slotted tube for sliding contact therewith.

5. A hot melt adhesive applicator in accordance with claim 4 and further comprising hand grip means for ease of manipulating said applicator in the hand of a user.

* * * * *